(12) United States Patent
Serizawa et al.

(10) Patent No.: US 12,244,785 B2
(45) Date of Patent: Mar. 4, 2025

(54) STATE MONITORING METHOD AND STATE MONITORING SYSTEM

(71) Applicant: Hitachi, Ltd., Tokyo (JP)

(72) Inventors: Yasutaka Serizawa, Tokyo (JP);
Hisanori Matsumoto, Tokyo (JP);
Goichi Ono, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 99 days.

(21) Appl. No.: 18/218,261

(22) Filed: Jul. 5, 2023

(65) Prior Publication Data

US 2024/0022701 A1    Jan. 18, 2024

(30) Foreign Application Priority Data

Jul. 12, 2022   (JP) ................. 2022-112083

(51) Int. Cl.
*G06V 20/52* (2022.01)
*G06T 7/80* (2017.01)
*H04N 13/296* (2018.01)

(52) U.S. Cl.
CPC ............ *H04N 13/296* (2018.05); *G06T 7/85* (2017.01); *G06V 20/52* (2022.01); *G06T 2207/30232* (2013.01); *G06T 2207/30244* (2013.01)

(58) Field of Classification Search
CPC ........................................ G06V 20/52
See application file for complete search history.

(56) References Cited

U.S. PATENT DOCUMENTS

2020/0402281 A1    12/2020   Maruyama

FOREIGN PATENT DOCUMENTS

| JP | 2020-205549 A | 12/2020 |
| JP | 2022-12398 A | 1/2022 |

*Primary Examiner* — Y Lee
(74) *Attorney, Agent, or Firm* — Crowell & Moring LLP

(57) ABSTRACT

The state monitoring system includes: a 3D camera configured to acquire an image in a work area; and information processing apparatus connected to the 3D camera and including a processing unit and a storage unit. The processing unit calculates a camera setting parameter that determines an imaging condition of the 3D camera with respect to a monitoring target as a target to be monitored in the work area and stores the camera setting parameter in the storage unit, determines the imaging condition of the 3D camera by applying the camera setting parameter corresponding to the monitoring target with reference to the camera setting parameter stored in the storage unit, acquires an image of the monitoring target from the 3D camera configured to image the monitoring target in the determined imaging condition, and determines a state of the monitoring target based on the acquired image of the monitoring target.

15 Claims, 5 Drawing Sheets

LAYOUT EXAMPLE OF MANUFACTURING SITE

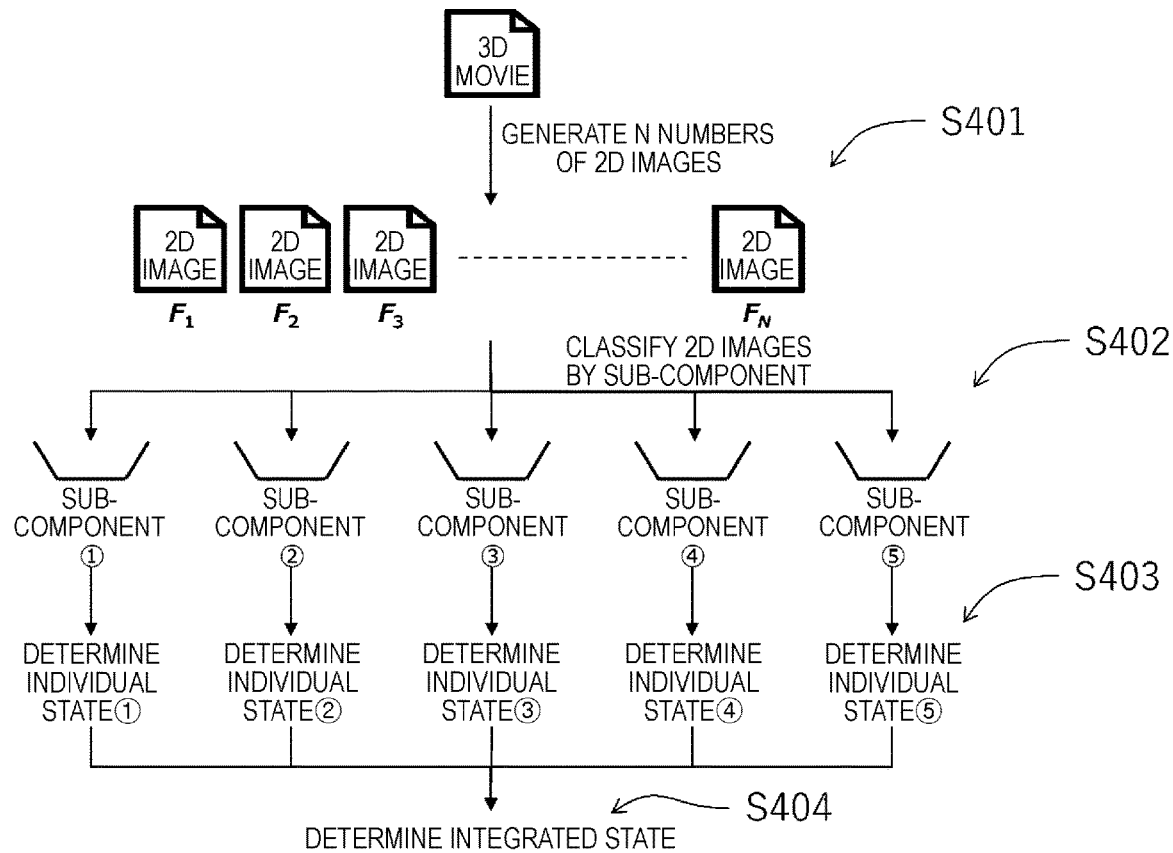

FIG. 5

FACILITY MANAGEMENT TREE DB — 51

| SITE MANAGEMENT LAYER | COMPONENT LAYER | SUB-COMPONENT LAYER | STATE MANAGEMENT LAYER |
|---|---|---|---|
| FLOOR A | ... | ... | ... |

POSITION MANAGEMENT DB — 52

| COMPONENT LAYER | POSITION COORDINATES | PRINCIPAL PLANE, NORMAL VECTOR |
|---|---|---|
| SCREW COMPRESSOR ① | (x1, y1, z1) | P1, n1 (→) |
| PROCESSOR ① | (x2, y2, z2) | ... |
| WORKER ① | (x3, y3, z3) | ... |
| CAMERA ① | (x4, y4, z4) | ... |

CAMERA INSTALLATION INFORMATION DB — 53

| COMPONENT LAYER | POSITION COORDINATES | PARAMETER (FOV, FPS, RESOLUTION) |
|---|---|---|
| CAMERA ① | (a1, b1, c1) | ... |
| CAMERA ② | (a2, b2, c2) | ... |
| CAMERA ③ | (a3, b3, c3) | ... |
| CAMERA ④ | (a4, b4, c4) | ... |

FIG. 6

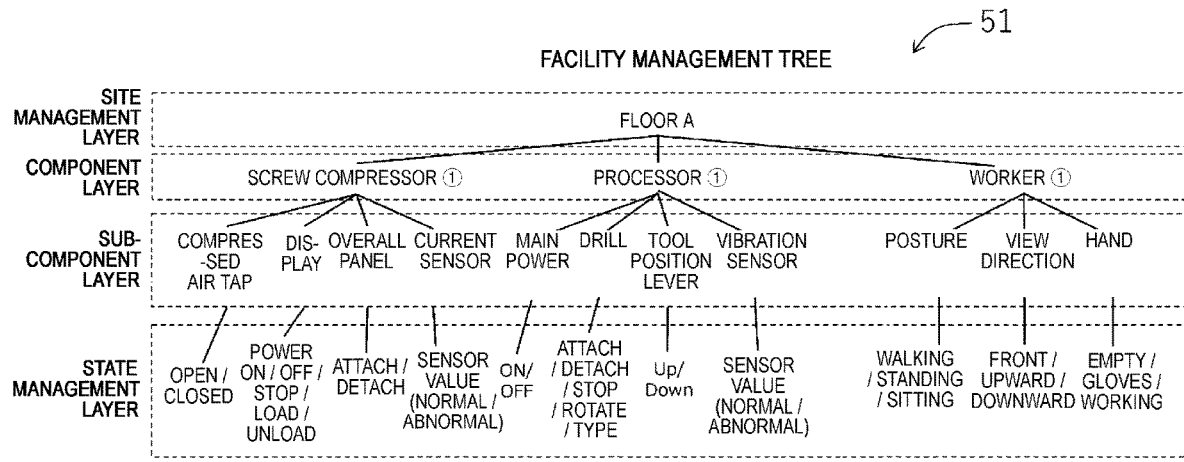

STATE MONITORING METHOD AND STATE MONITORING SYSTEM

BACKGROUND OF THE INVENTION

1. Field of the Invention

The present invention relates to a state monitoring method and a state monitoring system.

2. Description of Related Art

Recently, from the viewpoint of labor shortage or the like in the manufacturing sector, a technique for industrial labor saving has been developed. For example, a digital transformation (DX) technique of supporting the work of a worker based on an image of a monitoring target such as a facility acquired by a camera and contributing to improvement of resiliency of the manufacturing industry is considered.

Here, JP2022-012398A discloses a technique of determining a position and an orientation of a camera. That is, JP2022-012398A discloses information processing apparatus including: an identification unit configured to identify a position and an orientation of a virtual viewpoint corresponding to a virtual viewpoint image that is generated based on a plurality of images obtained by imaging an imaging target region at different positions using a plurality of imaging apparatus; and a determination unit configured to determine positions and orientations of the plurality of imaging apparatus based on the position and the orientation of the virtual viewpoint identified by the identification unit.

JP2020-205549A discloses a technique for improving the continuity of a movie before and after switching between a virtual viewpoint movie and a real camera movie. That is, JP2020-205549A discloses movie processing apparatus that can switch display between a virtual viewpoint movie corresponding to a virtual viewpoint and a real camera movie acquired by a real camera, the movie processing apparatus comprising: a control unit configured to control the virtual viewpoint such that a composition of the virtual viewpoint movie matches with a composition of the real camera movie before switching the movie; and a presentation unit configured to present a switching support screen including a virtual viewpoint movie corresponding to the controlled virtual viewpoint and the real camera movie.

It is considered that a predetermined monitoring target can be appropriately imaged by using the techniques of JP2022-012398A and JP2020-205549A.

However, for example, it is considered that, on a manufacturing site, a long work time is required to set an imaging condition of a camera depending on monitoring targets, and thus the total work time is delayed. For example, it is considered that, when maintenance of one monitoring target (in the present example, a compressor) is executed and subsequently maintenance of another monitoring target (in the present example, a processor) is executed, a long period of time is required to manually change settings of an imaging condition of a camera from settings for imaging the compressor to settings for imaging the processor, and thus the total work time is delayed.

SUMMARY OF THE INVENTION

Accordingly, an object of the present invention is to provide a state monitoring method and a state monitoring system that can provide an appropriate support to a worker while preventing a delay in work time caused by settings of a camera and can contribute from social viewpoints such as reduction in productive age population or labor shortage.

According to a first aspect of the present invention, the following state monitoring method is provided. That is, the state monitoring method is a method using a 3D camera configured to acquire an image in a work area and information processing apparatus connected to the 3D camera and including a processing unit and a storage unit. The method includes allowing the processing unit to calculate a camera setting parameter that determines an imaging condition of the 3D camera with respect to a monitoring target as a target to be monitored in the work area and store the camera setting parameter in the storage unit, to determine the imaging condition of the 3D camera by applying the camera setting parameter corresponding to the monitoring target with reference to the camera setting parameter stored in the storage unit, to acquire an image of the monitoring target from the 3D camera configured to image the monitoring target in the determined imaging condition, and to determine a state of the monitoring target based on the acquired image of the monitoring target.

According to a second aspect of the present invention, the following state monitoring system is provided. That is, the state monitoring system includes: a 3D camera configured to acquire an image in a work area; and information processing apparatus connected to the 3D camera. The information processing apparatus includes a processing unit and a storage unit.

The processing unit calculates a camera setting parameter that determines an imaging condition of the 3D camera with respect to a monitoring target as a target to be monitored in the work area and stores the camera setting parameter in the storage unit, determines the imaging condition of the 3D camera by applying the camera setting parameter corresponding to the monitoring target with reference to the camera setting parameter stored in the storage unit, acquires an image of the monitoring target from the 3D camera configured to image the monitoring target in the determined imaging condition, and determines a state of the monitoring target based on the acquired image of the monitoring target.

According to the present invention, there are provided a state monitoring method and a state monitoring system that can provide an appropriate support to a worker while preventing a delay in work time caused by settings of a camera and can contribute from social viewpoints such as reduction in productive age population or labor shortage. Objects, configurations, and effects other than those described above will be clarified by describing the following embodiments of the present invention.

BRIEF DESCRIPTION OF THE DRAWINGS

FIG. 4 is a conceptual diagram illustrating an example of an image determination process utilizing a 3D movie in the state monitoring system;

FIG. 5 is a diagram illustrating an example of a database stored in the state monitoring system;

FIG. 6 is a diagram illustrating an example of a facility management tree.

DESCRIPTION OF EMBODIMENTS

Figure 1:
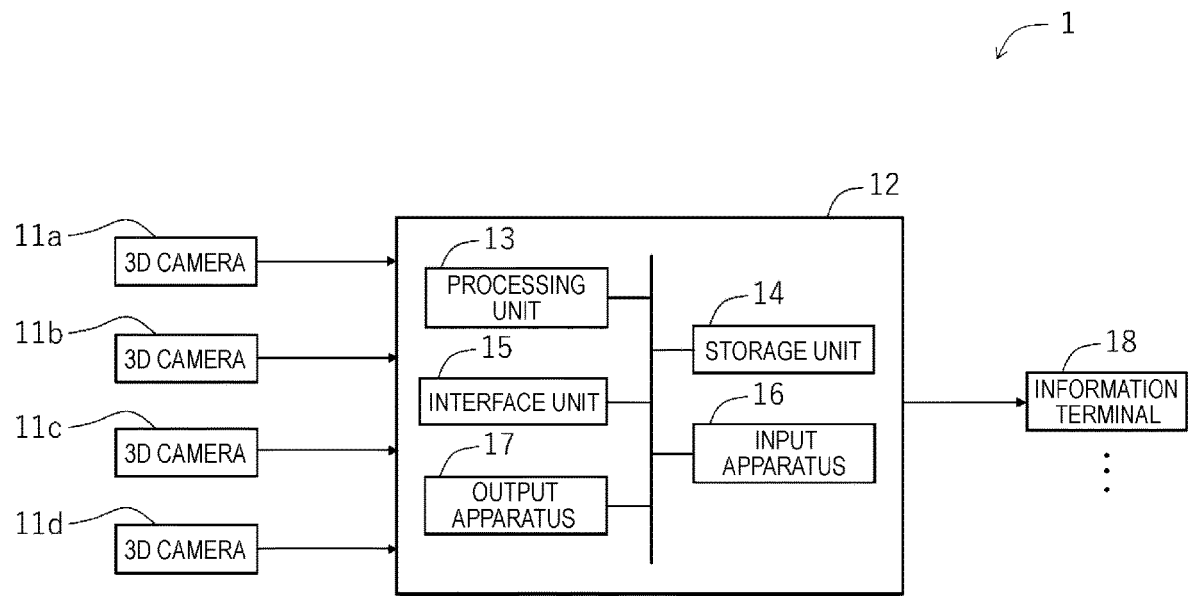
FIG. 1 is a diagram illustrating an example of a hardware configuration of a state monitoring system.

Hereinafter, embodiments of the present invention will be described with reference to the drawings. The embodiments are merely exemplary for describing the present invention and will not be repeated or will be simplified to clarify the description. The present invention can be implemented in other various embodiments. Unless specified otherwise, the number of each of components may be one or plural.

For easy understanding of the present invention, the position, size, shape, range, and the like of each of the components illustrated in the drawings do not necessarily represent the actual ones. Therefore, the present invention is not necessarily limited to the position, size, shape, range, and the like illustrated in the drawings.

For example, various information may be described using the expression "table", "list", "queue", or the like. However, various information may be expressed using a data structure other than "table", "list", or "queue". For example, various information such as "XX table", "XX list", or "XX queue" may be used as "XX information". To describe identification information, the expressions "identification information", "identifier", "name", "ID", "number", and the like are used and can be replaced with each other.

When a plurality of components having the same or identical function are present, different suffixes may be added to the same reference numeral in the description. When it is not necessary to distinguish between the components, the suffixes are removed in the description.

In the embodiments, in the following description, a process may be executed by executing a program. Here, a computer executes a program using a processor (for example, a CPU or a GPU) to execute a process determined by the program while using a storage resource (for example, a memory) or an interface device (for example, a communication port). Therefore, the subject of the process that is executed by executing the program may be a processor. Likewise, the subject of the process that is executed by executing the program may be a controller, apparatus, a system, a computer, or a node that includes a processor. The subject of the process that is executed by executing a program may be an arithmetic unit or may include a dedicated circuit that executes a specific process. Here, examples of the dedicated circuit include a field programmable gate array (FPGA), an application specific integrated circuit (ASIC), and a complex programmable logic device (CPLD).

The program may be installed from a program source into a computer. The program source may be, for example, a program distribution server or a storage medium that is readable by a computer. When the program source is the program distribution server, the program distribution server includes a processor and a storage resource that stores a program to be distributed, and the processor of the program distribution server may distribute the program to be distributed to another computer. In the embodiments, two or more programs may be implemented as one program, or one program may be implemented as two or more programs.

In a first embodiment, a state monitoring system 1 will be described. First, an example of a hardware configuration of the state monitoring system will be described with reference to FIG. 1. As illustrated in FIG. 1, the state monitoring system 1 includes 3D cameras (11a to 11d), information processing apparatus 12, and an information terminal 18.

The 3D cameras (11a to 11d) are cameras that can acquire not only two-dimensional (X,Y) information but also depth (Z) information. In the embodiment, the state monitoring system 1 includes a plurality of 3D cameras.

The information processing apparatus 12 includes a processing unit 13, a storage unit 14, an interface unit 15, input apparatus 16, and output apparatus 17. The processing unit 13 is configured to execute data processing and is configured to include a processor. The processing unit 13 can be configured, for example, using a central processing unit (CPU) and may be configured using another type of semiconductor device. The processing unit 13 may be configured, for example, using a graphics processing unit (GPU). The storage unit 14 is configured to store data and can be configured to include main storage apparatus and auxiliary storage apparatus. The main storage apparatus can be configured with, for example, a random access memory (RAM). The processing unit 13 reads data to the main storage apparatus and executes data processing. The auxiliary storage apparatus is a non-volatile device that stores data such as a program used for a process, and can be configured appropriately using a hard disk drive (HDD). The interface unit 15 can be configured to include an input/output interface and a communication interface. The input/output interface is an interface used for data input and output, and data is input and output via the input/output interface. The input apparatus 16 is an apparatus that is used by an operator of the information terminal apparatus 12 to input data, and can be configured appropriately using a keyboard, a touch panel, or the like. The output apparatus 17 is an apparatus that presents data to the operator of the information terminal apparatus 12, and can be configured using an appropriate display. The communication interface is an interface used for data communication, and executes data communication via the communication interface. As the communication, for example, appropriate wireless communication can be adopted.

The information terminal 18 is carried by a worker in a work area, and information acquired by the information processing apparatus 12 is output to the information terminal 18. The information terminal 18 can be configured with, for example, a smartphone or a head-mounted display. The number of the information terminals 18 is not particularly limited, and may be appropriately determined depending on, for example, the number of workers.

Figure 2:
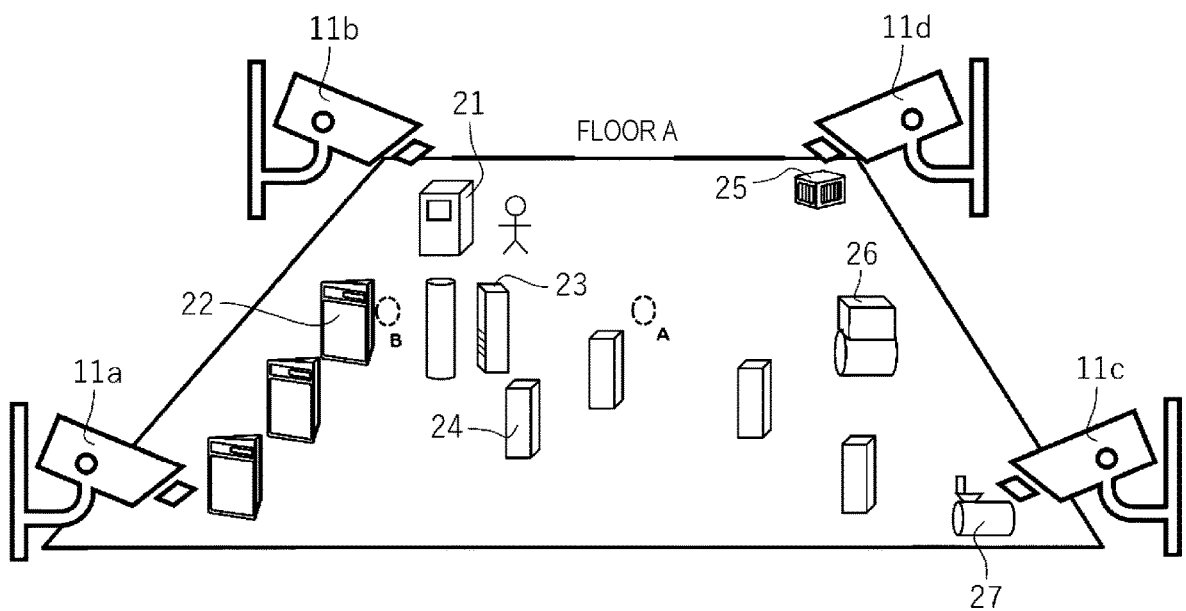
FIG. 2 is a diagram illustrating an example of a layout of a manufacturing site.

Next, a manufacturing site used for the state monitoring system will be described with reference to FIG. 2. FIG. 2 is a diagram illustrating an example of a layout of the manufacturing site.

As illustrated in FIG. 2, in a work area of the manufacturing site, a control unit 21, a screw compressor 22, an air tank 23, a machining equipment 24, a transformer 25, a BEBICON 26 (compressor), a pump 27, and the like are disposed. Although not illustrated in FIG. 2, a pipe through which compressed air from the BEBICON 26 flows, a pipe through which a coolant from the pump 27 flows, and a conductor such as electric wire through which electrical power from the transformer 25 flows are appropriately provided. The plurality of 3D cameras (11a to 11d) are disposed in the work area.

Each of the 3D cameras (11a to 11d) can be easily disposed such that the entire work area can be overlooked, and each of the 3D cameras 11 can acquire a 3D free-viewpoint movie. Here, for example, to favorably image a position of an A portion or a B portion, it is necessary to set the 3D cameras (11a to 11d) to imaging conditions suitable for imaging each of the positions. In the present specification, the 3D free-viewpoint movie includes at least a movie from which a 3D movie from another viewpoint different from the viewpoint of each of the 3D cameras can be obtained. The movie from the other viewpoint may be two-dimensional (2D).

Figure 3:
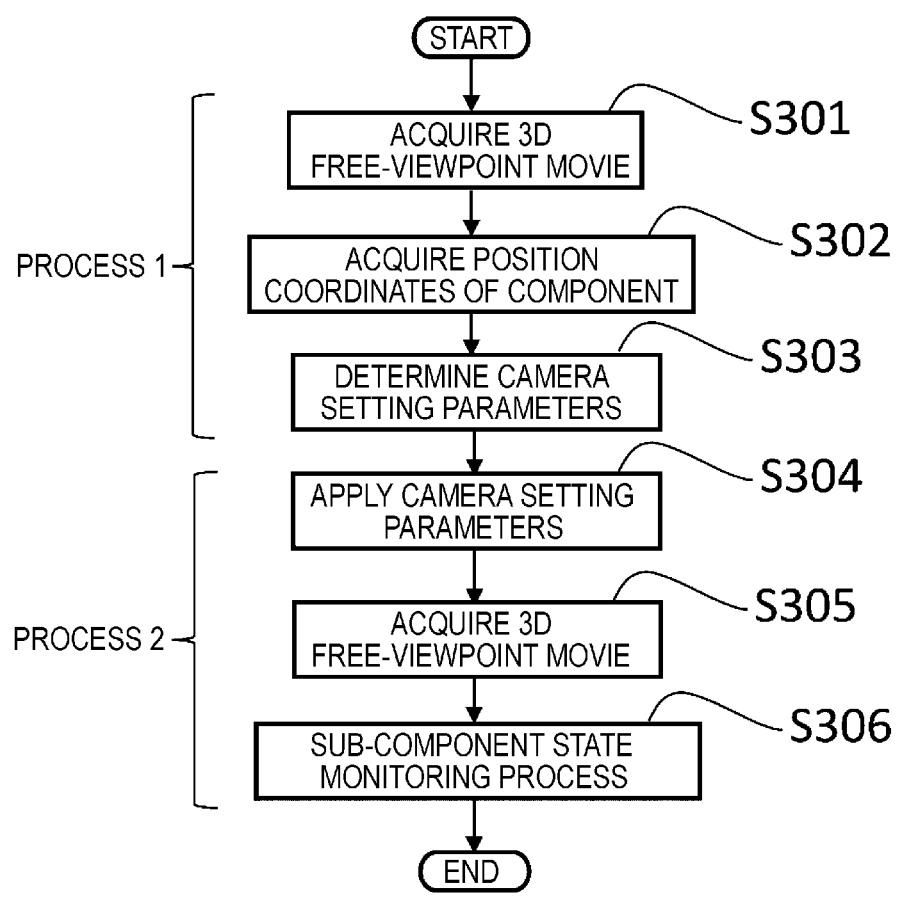
FIG. 3 is a flowchart illustrating an example of a process of the state monitoring system.

Next, a process of the state monitoring system will be described with reference to FIG. 3. FIG. 3 is a flowchart illustrating an example of the process of the state monitoring system. First, a portion (S301 to S303) of a process 1 will be described. In the process 1, when the processing unit 13 executes rough 3D movie processing to image each of monitoring targets, the processing unit 13 calculates camera setting parameters that determine imaging conditions of the 3D cameras (11a to 11d). In the description of the present specification, the monitoring target or the 3D camera in the work area will be called a component.

First, the processing unit 13 controls the 3D cameras (11a to 11d) to acquire a 3D free-viewpoint movie of the entire work area (in FIG. 2, the entire floor A) (S301). As a result, a rough 3D movie of the entire work area is acquired. Next, the processing unit 13 acquires position coordinates of a component as a monitoring target based on acquired information of each of the 3D cameras (11a to 11d) (S302). Next, the processing unit 13 determines camera setting parameters for favorably imaging the components depending on the components based on the position coordinates of the components, respectively (S303). It is preferable that the 3D free-viewpoint movie is acquired in a static environment (that is, an environment where an object does not move) in S301 and the position coordinates of the component are acquired based on the 3D free-viewpoint movie in S302. As a result, the position coordinates are acquired more accurately. On the other hand, the processing unit 13 may acquire the position coordinates using position management information 52 described below instead of the processes of S301 and S302.

S303 will be described in more detail. The processing unit 13 determines, as a camera setting parameter, an orientation in which the component is seen from each of the 3D cameras (11a to 11d) based on the position coordinates of the component as a monitoring target. Here, the orientation in which the component is seen corresponds to an orientation in which the component is present with respect to the position of the 3D camera. The processing unit 13 determines a camera setting parameter for focusing the 3D cameras (11a to 11d) on the component. That is, the processing unit 13 determines a camera setting parameter that determines a balance between the focus of each of the 3D cameras (11a to 11d) on the component and an viewing angle thereof.

The processing unit 13 determines a camera setting parameter that adjusts zoom and exposure of each of the 3D cameras (11a to 11d). Thereby, the processing unit 13 determines the camera setting parameters with which a favorable image of the component can be acquired from the viewpoints of focus, zoom, exposure, and the like. The camera setting parameters may include other elements different from the above elements and, for example, may include a value with which pixel interpolation is executed on images acquired by the 3D cameras (11a to 11d) when the monitoring target is imaged.

First, a portion (S304 to S306) of a process 2 will be described. In the process 2, the processing unit 13 executes finer 3D movie processing than the above-described process 1. That is, by reconfiguring the 3D free-viewpoint movie based on the above-described camera setting parameters, the processing unit 13 generates an image corresponding to the component as the monitoring target, and further executes state recognition by image recognition.

The processing unit 13 applies the above-described camera setting parameters to change a set value (S304). That is, the processing unit 13 inputs the camera setting parameters corresponding to the monitored component, and controls each of the 3D cameras (11a to 11d) to image the component according to the camera setting parameters.

The processing unit 13 generates and acquires a 3D free-viewpoint movie obtained by appropriately imaging the monitored component based on the camera setting parameters applied in S304 (S305). Here, when the 3D free-viewpoint movie is generated and acquired, an appropriate 3D free-viewpoint movie can also be acquired with higher accuracy by using a plurality of 3D cameras that are temporarily installed near the component in combination with the results of controlling the 3D cameras (11a to 11d) based on the camera setting parameters applied in S304. Next, the processing unit 13 determines states of sub-components (S306). Here, the sub-components are configured to belong to the component, and the sub-components correspond to components configuring the component or elements in the component. For example, when the component is a screw compressor 22, the sub-components include a compressed air tap and a current sensor. Here, as an example of a state of the sub-component, the processing unit 13 determines whether the compressed air tap is open or closed, and determines whether a sensor value of the current sensor is a normal value or an abnormal value. In the state monitoring process of the sub-component, the state can be determined by an appropriate image determination process. The processing unit 13 determines whether the compressed air tap is open or closed, for example, by executing image recognition on the portion of the compressed air tap. The processing unit 13 determines whether the sensor value is normal or abnormal by executing image recognition on a meter representing a sensor value of the current sensor.

Next, an example of the image determination process utilizing the 3D movie by the state monitoring system will be described with reference to FIG. 4. This process relates to the above-described process 2.

The processing unit 13 generates N numbers of 2D images (two-dimensional images) based on the 3D movie acquired in S305 (S401). The N numbers of 2D images are different from each other, and the processing unit 13 generates, for example, the 2D images of the component from a plurality of different viewpoints.

Here, the 2D images may be generated appropriately using a method. For example, the processing unit 13 generates the 2D images by converting point cloud data of the 3D movie.

The processing unit 13 classifies the generated N 2D images by the sub-components (S402). For example, when the 3D movie of the screw compressor 22 is acquired as the component, the processing unit 13 classifies the 2D images by the sub-components such as the compressed air tap or the current sensor.

Here, the processing unit 13 may classify the 2D images using an appropriate method, for example, the following method. That is, the processing unit 13 executes image recognition on the component using a neural network. The neural network can be constructed using appropriate image data, and a model that estimates the type of the component in response to an input of the 2D image can be generated. The processing unit 13 identifies the type of the sub-component using the result (the type of the component in the 2D image) and a facility management tree 51 described below. The processing unit 13 classifies the 2D images by the identified sub-components by executing appropriate image recognition on the 2D images. Here, the processing unit 13 may classify the 2D images by executing a process of extracting the sub-components from the 2D images.

Here, the processing unit 13 determines states of the sub-components depending on the classified sub-components by executing image recognition as in S306 (S403). The processing unit 13 determines an overall state regarding the state of each of the sub-components of the predetermined component by making comprehensive determination based on each of the determination results (S404). In S404, the processing unit 13 generates collective data regarding the type of the component and the state of each of the sub-components in the component.

Next, an example of a database stored in the state monitoring system will be described with reference to FIG. 5. As illustrated in FIG. 5, the state monitoring system 1 stores the facility management tree 51, the position management information 52, and camera installation information 53 in the storage unit 14 (specifically, the auxiliary storage apparatus).

First, the facility management tree 51 will be described. As illustrated in FIG. 6, the facility management tree 51 is data regarding facility management in the work area, is generated in advance for the state monitoring, and is stored in the storage unit 14. The facility management tree 51 has a layered structure including a plurality of layers and includes, in order from the top layer, a site management layer, a component layer, a sub-component layer, and a state management layer. The site management layer stores information regarding the work area and, in the example, stores a floor A as the work area. The component layer stores components in the work area and stores the screw compressor 22, the machining equipment 24, and a worker in the present example. The sub-component layer stores various sub-components in the component. The state management layer stores the state of each of the sub-components. Although the facility management tree 51 is described above, the aspect of the data structure may be appropriately changed as long as the database regarding the facility management can be appropriately constructed. For example, although the tree-form data is described above, table-form data may be adopted.

Next, the position management information 52 will be described. As illustrated in FIG. 5, the position management information 52 is data regarding the position of the component. The position management information 52 includes a component layer and position coordinates. The component layer is the same as that in the above-described facility management tree 51, and stores the components in the work area. The position coordinates store position coordinates of each of the components and, in the embodiment, store the position coordinates of the component acquired in S302 or the position coordinates of the installed 3D camera. The position coordinates of the components may be generated in advance based on actual position information of the components in the work area and stored before the start of the process 1 (that is, before the start of the process of calculating the camera setting parameters). Thereby, when the position coordinates of the components are generated to generate a database before the process 1, S301 and S302 in the process 1 may be skipped. The position management information 52 may store data other than the above-described data and, for example, may store data regarding a principal plane during imaging.

Next, the camera installation information 53 will be described. As illustrated in FIG. 5, the camera installation information 53 relates to installation information of the 3D cameras. The camera installation information 53 includes a component layer and position coordinates. The component layer stores identification information where the installed 3D cameras (11*a* to 11*d*) are distinguished from each other. The position coordinates represent the position coordinates of each of the 3D cameras (11*a* to 11*d*). Data other than the above-described data may be stored, for example, various parameters that represent the performances of the camera (for example, FOV (a field of view or an viewing angle), FPS (frame rate), or a resolution) may be stored.

A database of the camera setting parameters determined in S303 may be constructed. The storage unit 14 may store data where the camera setting parameters that determine the imaging conditions of the 3D cameras (11*a* to 11*d*) configured to image the component as the monitoring target are associated with the component. In S304, the processing unit 13 may determine the camera setting parameters with reference to the data. For example, when the 3D free-viewpoint movie of the component is acquired based on the camera setting parameters in S305, the processing unit 13 controls the 3D cameras (11*a* to 11*d*) with reference to information (for example, characteristics of the cameras such as FPS or a resolution) of various databases.

Figure 7:
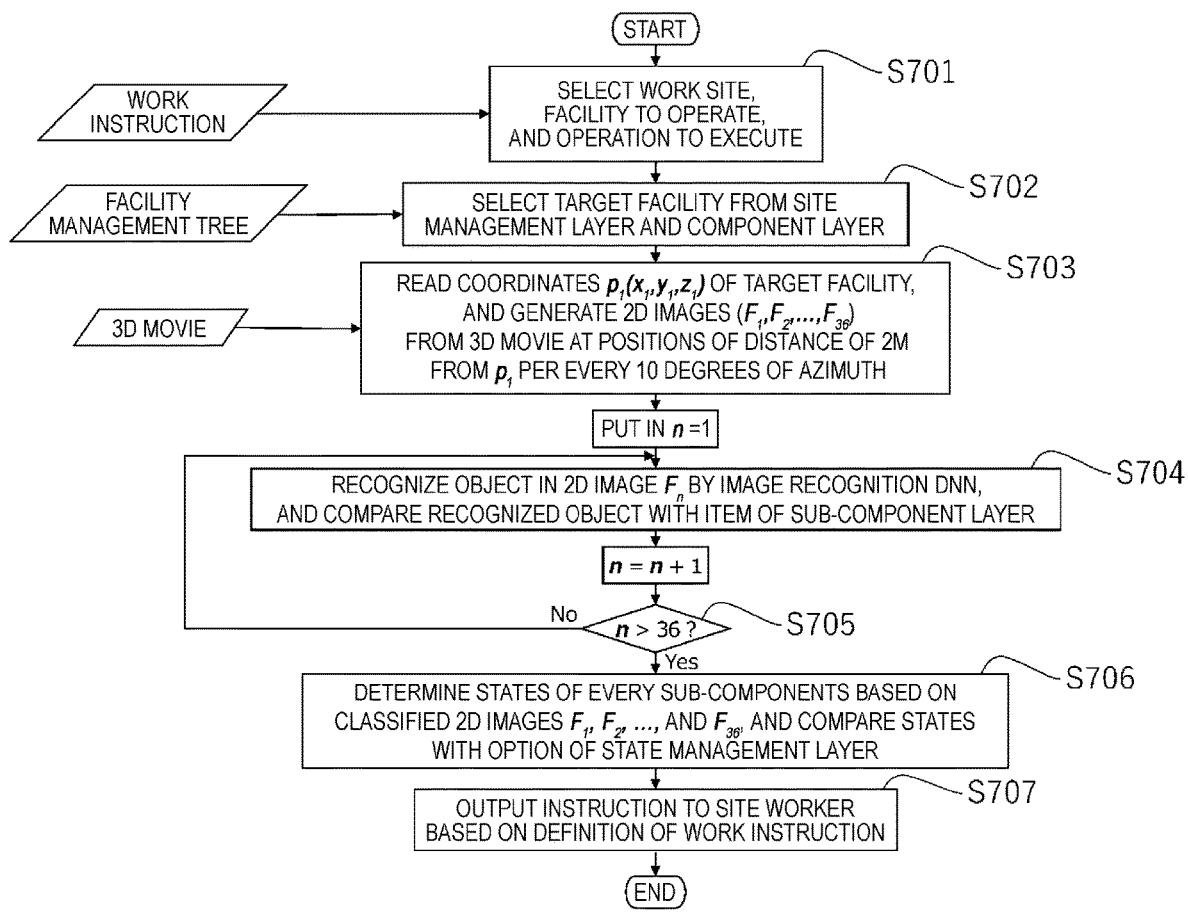
FIG. 7 is a flowchart illustrating an example of a monitoring method using the state monitoring system.

Next, a second embodiment will be described with reference to FIG. 7. In the second embodiment, an example of a monitoring method using the state monitoring system described in the first embodiment will be described. The same description as the above-described content will not be repeated.

First, an operator of the information processing apparatus 12 selects a work site, a facility to operate, and an operation to execute based on a work instruction (S701). The work instruction appropriately describes information regarding a work, for example, a list of work sites or work contents. The operator determines to operate, for example, the screw compressor 22 on the floor A based on the work instruction (S701).

The operator selects the target component (a facility or a worker) based on the facility management tree 51 to be output to the output apparatus 17 (S702). When the screw compressor 22 on the floor A is operated as described above, the operator determines "floor A" and "screw compressor" from the site management layer and the component layer of the facility management tree 51, and inputs the determined contents using the input apparatus 16.

Here, the information processing apparatus 12 controls the 3D cameras (11*a* to 11*d*) to image the component of the component input to the 3D cameras (11*a* to 11*d*). Here, the information processing apparatus 12 controls the 3D cameras (11*a* to 11*d*) based on the camera setting parameters corresponding to the target component to acquire a 3D movie of the component based on the camera setting parameters. When the database where the components and the camera setting parameters are associated with each other is constructed, the information processing apparatus 12 may execute a process with reference to this database. The information processing apparatus 12 may control the 3D cameras (11*a* to 11*d*) by appropriately using the camera installation information 53 and the like.

The information processing apparatus 12 generates N different 2D images relating to the target component from the acquired 3D movie (S703). As long as the appropriate 2D images can be generated, a method of generating the 2D images is not particularly limited. In the present example, the information processing apparatus 12 reads coordinates of the target facility and generates 36 2D images from the 3D movie at positions at a distance of 2 m from the position coordinates and per every 10 degrees of azimuthal angle. The information processing apparatus 12 can acquire coordinates of the target facility with reference to, for example, the database (position management information 51). In a state determination process (S706) of the sub-components based on the classified 2D images in the information processing apparatus 12 described below, if the state determination is executed using an image recognition deep neutral network (DNN), when a confidence value of the state determination is low, by changing a distance d [m] from the center or an interval angle a [degree] of azimuthal angle (or elevation angle), the state determination process (S706) of the sub-components may be executed with more appropriate 2D images. For example, tuning of decreasing the distance d to increase the number of components/sub-components in the FOV of the 2D images or decreasing the interval angle a to increase the number of 2D images can be executed.

The information processing apparatus 12 recognizes the target (component) in each of the generated N numbers of 2D images using the image recognition deep neutral network (DNN), and compares the recognized component to an item of the sub-component layer (S704). For example, when the screw compressor 22 is recognized from the 2D image, the information processing apparatus 12 compares the screw compressor 22 to the sub-component such as the compressed air tap with reference to the sub-component layer in the facility management tree 51. Here, the information processing apparatus 12 may execute the comparison using an appropriate method. For example, the information processing apparatus 12 may extract an image of a sub-component from the 2D image to compare the extracted image to the sub-component.

Through the process of S704, the 2D images are classified by the sub-components. In the embodiment, the information processing apparatus 12 determines whether every generated 2D images are classified by executing an increment process (S705).

After classifying every generated 2D images, the information processing apparatus 12 determines the states of the sub-components based on the classified 2D images (S706). Here, the image recognition DNN that is learned to output the states of the sub-components can be used at the time of the determination. In the embodiment, the information processing apparatus 12 determines the states of the sub-components based on the appropriate image recognition, and compares the states with options of the state management layer in the facility management tree 51.

Here, in the determination based on the plurality of 2D images that are classified into the same sub-component, the information processing apparatus 12 may determine different states of the sub-component. Here, the information processing apparatus 12 may output a state of the sub-component having a larger total number of 2D images as the result. For example, in the compressed air tap, when the number of 2D images representing an open state is three and the number of 2D images representing a closed state is six, the number of 2D images representing a closed state is larger. Therefore, the information processing apparatus 12 determines that the compressed air tap is in a closed state.

The information processing apparatus 12 may calculate reliability of the generated 2D image and may execute weighting based on reliability to determine the state of the sub-component. The information processing apparatus 12 calculates the reliability based on, for example, distances between the 3D cameras (11a to 11d) for imaging and the target component (that is, relative distances between the cameras and the component).

The process will be described in detail. For example, a case where the screw compressor 22 is imaged in the layout illustrated in FIG. 2 is considered. Here, in the following description, it is assumed that a distance between a camera A (3D camera 11a) and the screw compressor 22 and a distance between a camera B (3D camera 11b) and the screw compressor 22 are substantially the same, a distance between a camera C (3D camera 11c) and the screw compressor 22 and a distance between a camera D (3D camera 11d) and the screw compressor 22 are substantially the same, and the distances between the cameras A and B and the screw compressor 22 are shorter.

Here, since the distances between the cameras A and B and the screw compressor 22 are shorter, the information processing apparatus 12 calculates the reliability such that the reliability of the images acquired from the camera A and the camera B is higher. The information processing apparatus 12 can use the position management information 52 or the camera installation information 53 for the calculation of the reliability.

The information processing apparatus 12 sets the weights to the 2D images generated from the 3D movie of each of the cameras based on the calculated reliability. The information processing apparatus 12 evaluates the reliability of the 2D images, for example, by setting the weight "1" to the 2D images acquired using the camera A and the camera B and by setting the weight "0.5" to the 2D images acquired using the camera C and the camera D.

For example, in the compressed air tap, a case is assumed where the number of 2D images generated using the camera A or the camera B is one among three 2D images representing an open state and the number of 2D images generated using the camera A or the camera B is four among six 2D images representing a closed state. Here, the information processing apparatus 12 calculates the number of 2D images representing an open state as 2 (that is, 1+0.5×2), calculates the number of 2D images representing a closed state as 5 (that is, 4+0.5×2), and determines that the state of the sub-component is a closed state. Thereby, by executing weighting based on the camera distances, the state of the sub-component can be determined according to the reliability of the 2D images.

The reliability of 2D images used for the determination may be determined or selected based on a relative positional relationship between the cameras and the component in addition to the method of calculating the reliability based on, for example, distances between the 3D cameras (11a to 11d) for imaging and the target component (that is, relative distances between the cameras and the component). That is, the reliability can be set or the images can be selected based on a degree of agreement between a normal vector of a principal plane (for example, a surface on which a display as a sub-component is mounted among side surfaces of the screw compressor represented by circle 1 in FIG. 5) of the position management information 52 in FIG. 5 and a relative position vector configured by the component position coordinates (52) and the camera installation information (53) (for example, a relative position vector (x1−a1, y1−b1, . . . or z1−c1) of the screw compressor represented by circle 1—the camera represented by circle 1). As a result, 2D images acquired by imaging the component from an effective direction can be used for the determination, and occlusion can also be avoided.

When the image recognition DNN that is learned to output the states of the sub-components is used in addition to the method of calculating the reliability based on, for example, distances between the 3D cameras (11a to 11d) for imaging and the target component (that is, relative distances between the cameras and the component), a confidence value of the determination result by the DNN can also be used as the weight. As a result, determination differences caused by the determination accuracy of DNN can be averaged.

The operator of the information processing apparatus 12 outputs an instruction to a site worker based on the definition of the work instruction (S707). For example, when the screw compressor 22 is operated and when the result that the compressed air tap is in a closed state is acquired in S706, the operator instructs the worker to set the compressed air tap to enter an open state. The operator may execute the instruction using an appropriate method, and may output data representing the instruction to the information terminal 18 of the worker, for example, using an appropriate computer. The information processing apparatus 12 may output the data regarding the result acquired in S706 and the like to the information terminal 18 of the operator via communication.

A local area network (LAN) may be constructed on the work site, but the information processing apparatus 12 may be disposed at a remote location and execute the process using wireless communication.

The 3D cameras (11a to 11d) are not particularly limited as long as the cameras can appropriately image the component to be monitored based on the camera setting parameters. The 3D cameras (11a to 11d) may be configured to include a mechanism capable of changing an orientation to be imaged as in a dome camera. The 3D cameras (11a to 11d) may be provided through a bracket or the like.

Various aspects of the instruction to the worker by the operator can be considered. For example, when the information processing apparatus 12 is disposed on the work site and the operator gives an instruction to a worker on the work site, the instruction may be given directly by voice. Here, the information terminal 18 may be omitted.

According to the above description, provided are a state monitoring method and a state monitoring system in which a camera setting parameter that determines an imaging condition of the 3D camera (11a to 11d) with respect to a monitoring target as a target to be monitored in a work area is calculated, the imaging condition of the 3D camera (11a to 11d) is determined by applying the camera setting parameter corresponding to the monitoring target, an image of the monitoring target is acquired from the 3D camera (11a to 11d) configured to image the monitoring target based on the determined imaging condition, and a state of the monitoring target is determined based on the acquired image of the monitoring target. In the state monitoring method and the state monitoring system, an appropriate support can be provided to a worker by automation while preventing a delay in work time caused by settings of a camera, and contribution can be obtained from social viewpoints such as reduction in productive age population or labor shortage.

Position coordinates of the monitoring target may be acquired from the image acquired by the 3D camera (11a to 11d), and the camera setting parameter may be calculated based on the acquired position coordinates. Here, the position coordinates can be acquired from the 3D camera on the work site that images the work area, and the camera setting parameter can be calculated.

The position coordinates of the monitoring target may be acquired using the position management information 52, and the camera setting parameter may be calculated based on the acquired position coordinates. Here, the camera setting parameter can be calculated using information of a database that is constructed in advance.

A camera setting parameter that determines an orientation of the 3D camera (11a to 11d) with respect to the monitoring target may be calculated. Here, the orientation of the camera can be appropriately adjusted depending on the monitoring target. For example, a camera setting parameter where the monitoring target is positioned at the center of an image may be calculated.

A camera setting parameter that adjusts an viewing angle of the 3D camera (11a to 11d) with respect to the monitoring target may be calculated. Here, the viewing angle of the camera can be appropriately adjusted depending on the monitoring target. For example, a camera setting parameter where the entire monitoring target is just within an image may be calculated.

A camera setting parameter that executes pixel interpolation on the image acquired by the 3D camera (11a to 11d) when the monitoring target is acquired may be calculated. Here, the quality of an image of the monitoring target to be acquired can be improved.

The state of the sub-component may be determined by generating a plurality of two-dimensional images of the monitoring target from different viewpoints based on the image of the monitoring target acquired from the 3D camera (11a to 11d) and classifying the generated two-dimensional images depending on a configuration (sub-component) belonging to the monitoring target. Here, the state of the sub-component can be appropriately determined to support a worker.

An information terminal 18 may be used that is configured to output information regarding the state of the monitoring target determined by the information processing apparatus 12, the information terminal being carried by a worker in the work area. Here, a high-efficiency support can be implemented by outputting the information acquired by the information processing apparatus 12 to the information terminal 18 carried by the worker.

Hereinabove, the embodiments of the present invention have been described, but the present invention is not limited to the above-described embodiments. Within a range not departing from the scope of the present invention described in the claims, various design changes can be made. For example, the embodiments have been described in detail in order to easily describe the present invention, and the present invention is not necessarily to include every configurations described above. A part of the configuration of one embodiment can be replaced with the configuration of another embodiment. The configuration of one embodiment can be added to the configuration of another embodiment. Addition, deletion, and replacement of another configuration can be made for a part of the configuration of each of the embodiments.

What is claimed is:

1. A state monitoring method using a 3D camera configured to acquire an image in a work area and information processing apparatus connected to the 3D camera and including a processing unit and a storage unit, the method comprising:
   allowing the processing unit to
   calculate a camera setting parameter that determines an imaging condition of the 3D camera with respect to a monitoring target as a target to be monitored in the work area and store the camera setting parameter in the storage unit, determine the imaging condition of the 3D camera by applying the camera setting parameter corresponding to the monitoring target with reference to the camera setting parameter stored in the storage unit, acquire an image of the monitoring target from the 3D camera configured to image the monitoring target in the determined imaging condition, and determine a state of the monitoring target based on the acquired image of the monitoring target.

2. The state monitoring method according to claim 1, further comprising:

allowing the processing unit to acquire position coordinates of the monitoring target from the image acquired by the 3D camera, and calculate the camera setting parameter based on the acquired position coordinates.

3. The state monitoring method according to claim 1, further comprising:

allowing the storage unit to store position management information that is information regarding position coordinates of the monitoring target; and allowing the processing unit to acquire the position coordinates of the monitoring target using the position management information and calculate the camera setting parameter based on the acquired position coordinates.

4. The state monitoring method according to claim 1, further comprising allowing the processing unit to calculate a camera setting parameter that determines an orientation of the 3D camera with respect to the monitoring target.

5. The state monitoring method according to claim 1, further comprising allowing the processing unit to calculate a camera setting parameter that adjusts an viewing angle of the 3D camera with respect to the monitoring target.

6. The state monitoring method according to claim 1, further comprising allowing the processing unit to calculate a camera setting parameter that executes pixel interpolation on the image acquired by the 3D camera when the monitoring target is acquired.

7. The state monitoring method according to claim 1, further comprising:

allowing the processing unit to generate a plurality of two-dimensional images of the monitoring target from different viewpoints based on the image of the monitoring target acquired from the 3D camera, to classify the generated two-dimensional images depending on a configuration belonging to the monitoring target, and to determine a state of the configuration belonging to the monitoring target.

8. A state monitoring system comprising:

a 3D camera configured to acquire an image in a work area; and information processing apparatus connected to the 3D camera, wherein the information processing apparatus includes a processing unit and a storage unit, and the processing unit calculates a camera setting parameter that determines an imaging condition of the 3D camera with respect to a monitoring target as a target to be monitored in the work area and stores the camera setting parameter in the storage unit, determines the imaging condition of the 3D camera by applying the camera setting parameter corresponding to the monitoring target with reference to the camera setting parameter stored in the storage unit, acquires an image of the monitoring target from the 3D camera configured to image the monitoring target in the determined imaging condition, and determines a state of the monitoring target based on the acquired image of the monitoring target.

9. The state monitoring system according to claim 8, wherein the processing unit acquires position coordinates of the monitoring target from the image acquired by the 3D camera, and calculates the camera setting parameter based on the acquired position coordinates.

10. The state monitoring system according to claim 8, wherein the storage unit stores position management information that is information regarding position coordinates of the monitoring target, and the processing unit acquires the position coordinates of the monitoring target using the position management information, and calculates the camera setting parameter based on the acquired position coordinates.

11. The state monitoring system according to claim 8, wherein the processing unit calculates a camera setting parameter that determines an orientation of the 3D camera with respect to the monitoring target.

12. The state monitoring system according to claim 8, wherein the processing unit calculates a camera setting parameter that adjusts an viewing angle of the 3D camera with respect to the monitoring target.

13. The state monitoring system according to claim 8, wherein the processing unit calculates a camera setting parameter that executes pixel interpolation on the image acquired by the 3D camera when the monitoring target is acquired.

14. The state monitoring system according to claim 8, wherein the processing unit generates a plurality of two-dimensional images of the monitoring target from different viewpoints based on the image of the monitoring target acquired from the 3D camera, classifies the generated two-dimensional images depending on a configuration belonging to the monitoring target, and determines a state of the configuration belonging to the monitoring target.

15. The state monitoring system according to claim 8, further comprising an information terminal configured to output information regarding the state of the monitoring target determined by the information processing apparatus, the information terminal being carried by a worker in the work area.

* * * * *